United States Patent
Lim et al.

(10) Patent No.: US 10,477,231 B2
(45) Date of Patent: Nov. 12, 2019

(54) METHOD AND DEVICE FOR PREDICTING BLOCK ON BASIS OF ILLUMINATION COMPENSATION IN IMAGE CODING SYSTEM

(71) Applicant: LG Electronics Inc., Seoul (KR)

(72) Inventors: Jaehyun Lim, Seoul (KR); Seungwook Park, Seoul (KR); Junghak Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 5 days.

(21) Appl. No.: 15/737,037

(22) PCT Filed: Dec. 9, 2015

(86) PCT No.: PCT/KR2015/013447
§ 371 (c)(1),
(2) Date: Dec. 15, 2017

(87) PCT Pub. No.: WO2016/204360
PCT Pub. Date: Dec. 22, 2016

(65) Prior Publication Data
US 2018/0176592 A1    Jun. 21, 2018

Related U.S. Application Data

(60) Provisional application No. 62/180,072, filed on Jun. 16, 2015.

(51) Int. Cl.
*H04N 19/46*     (2014.01)
*H04N 19/513*    (2014.01)
(Continued)

(52) U.S. Cl.
CPC ......... *H04N 19/513* (2014.11); *H04N 19/117* (2014.11); *H04N 19/136* (2014.11);
(Continued)

(58) Field of Classification Search
CPC .... H04N 19/176; H04N 19/82; H04N 19/136; H04N 19/46
See application file for complete search history.

(56) References Cited

U.S. PATENT DOCUMENTS 9,473,792 B2 * 10/2016 Srinivasamurthy .... H04N 19/46
9,860,529 B2 *  1/2018 Zhang .................... H04N 19/51
(Continued)

FOREIGN PATENT DOCUMENTS

CN   101715652    5/2010
CN   102215389    10/2011
(Continued)

OTHER PUBLICATIONS

Editor, "Test Model 11 of 3D-HEVC and MV-HEVC," JCT3V-K1003, Joint Collaborative Team on 3D Video Coding Extension Development of ITU-T SG 16 WP3 and ISO/IEC JTC I/SC29/WG 11, 11th Meeting: Geneva, CH, Feb. 12-18, 2015, 58 pages.*
(Continued)

*Primary Examiner* — Tsion B Owens
(74) *Attorney, Agent, or Firm* — Fish & Richardson P.C.

(57) ABSTRACT

A block prediction method for decoding a picture, according to the present invention, comprises the steps of: deriving a reference block from a reference picture to predict a current block in a current picture; determining a reference illumination compensation (IC) parameter; generating an illumination-compensated reference block by applying reference IC to the reference block on the basis of the reference IC parameter; and generating a predicted sample of the current block on the basis of the illumination-compensated reference block. According to the present invention, an illumination difference between the current block of the current picture and the reference block of the reference picture can be compensated for, block prediction efficiency can be increased, and a data amount of a residual signal to be
(Continued)

transmitted from an encoder to a decoder is reduced. Therefore, compression and coding efficiency can be increased.

16 Claims, 7 Drawing Sheets

(51) Int. Cl.
*H04N 19/176* (2014.01)
*H04N 19/117* (2014.01)
*H04N 19/136* (2014.01)
*H04N 19/186* (2014.01)
*H04N 19/82* (2014.01)
*H04N 19/105* (2014.01)

(52) U.S. Cl.
CPC ......... *H04N 19/176* (2014.11); *H04N 19/186* (2014.11); *H04N 19/82* (2014.11); *H04N 19/105* (2014.11); *H04N 19/46* (2014.11)

(56) References Cited

U.S. PATENT DOCUMENTS

| | | | | |
|---|---|---|---|---|
| 10,218,957 | B2* | 2/2019 | Huang | H04N 13/161 |
| 10,257,531 | B2* | 4/2019 | Lee | H04N 19/46 |
| 2008/0304760 | A1* | 12/2008 | Lee | H04N 19/597 |
| | | | | 382/238 |
| 2012/0128068 | A1 | 5/2012 | Thoreau et al. | |
| 2015/0381986 | A1* | 12/2015 | Chen | H04N 19/597 |
| | | | | 348/43 |
| 2017/0155920 | A1* | 6/2017 | Park | H04N 19/105 |
| 2019/0200021 | A1* | 6/2019 | Park | H04N 19/132 |

FOREIGN PATENT DOCUMENTS

| | | |
|---|---|---|
| CN | 101325715 | 4/2012 |
| CN | 103688543 | 3/2014 |
| JP | 2014236264 | 12/2014 |
| KR | 10-2008-0108774 | 12/2008 |
| KR | 10-2012-0095611 | 8/2012 |
| KR | 10-2013-0003816 | 1/2013 |

OTHER PUBLICATIONS

Samsung Electronics Co., Ltd., "Parameter Derivation for Illumination Compensation," JCT3V-I0080, Joint Collaborative Team on 3D Video Coding Extensions of ITU-T SG 16 WP 3 and ISO/IEC JTC 1/SC 29/WG 11, 9th Meeting: Sapporo, JP, Jul. 3-9, 2014, 5 pages.*
Sejong University and SK telecom, "Pixel Based Illumination Compensation," JCTVC-F417, Joint Collaborative Team on Video Coding (JCT-VC) of ITU-T SGI6 WP3 and ISO/IEC JTC1/SC29/WG1, 6th Meeting: Torino, IT, Jul. 14-22, 2011, 8 pages.*
Sejong University and SK telecom, "Pixel Based Illumination Compensation," JCTVC-F417, Joint Collaborative Team on Video Coding (JCT-VC) of ITU-T SG16 WP3 and ISO/IEC JTC1/SC29/WG1, 6th Meeting: Torino, IT, Jul. 14-22, 2011, 8 pages.
Supplementary European Search Report in European Appln. No. 15895747.2, dated Dec. 4, 2018, 8 pages.

* cited by examiner

FIG. 5
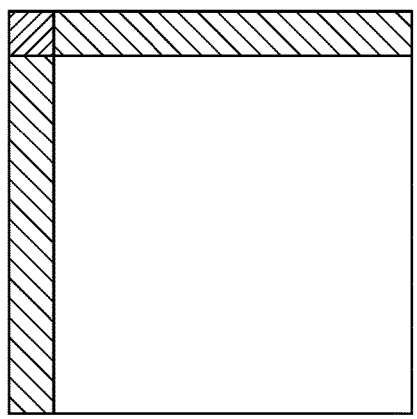
(a)
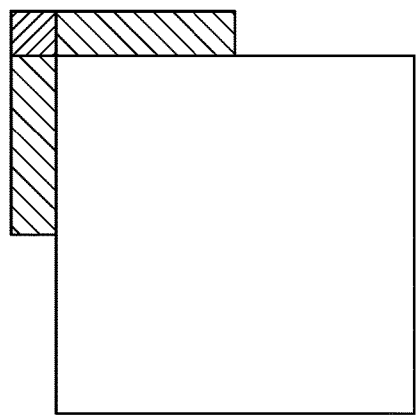
(b)
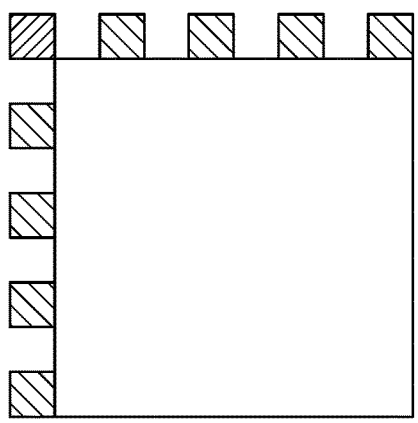
(c)
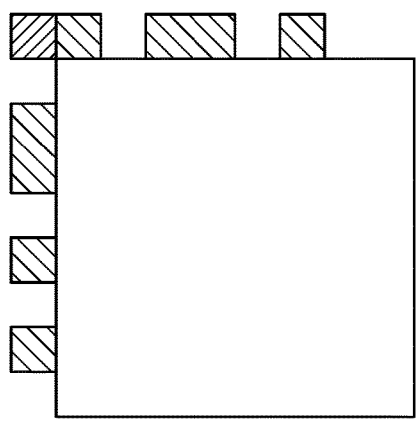
(d)

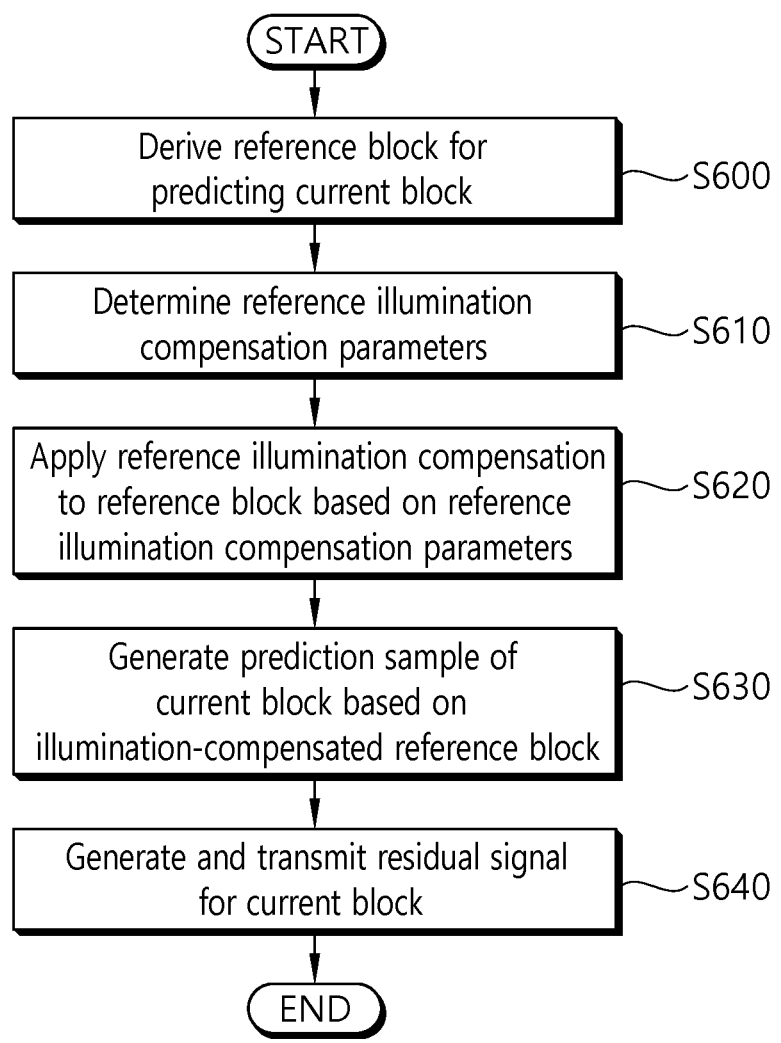

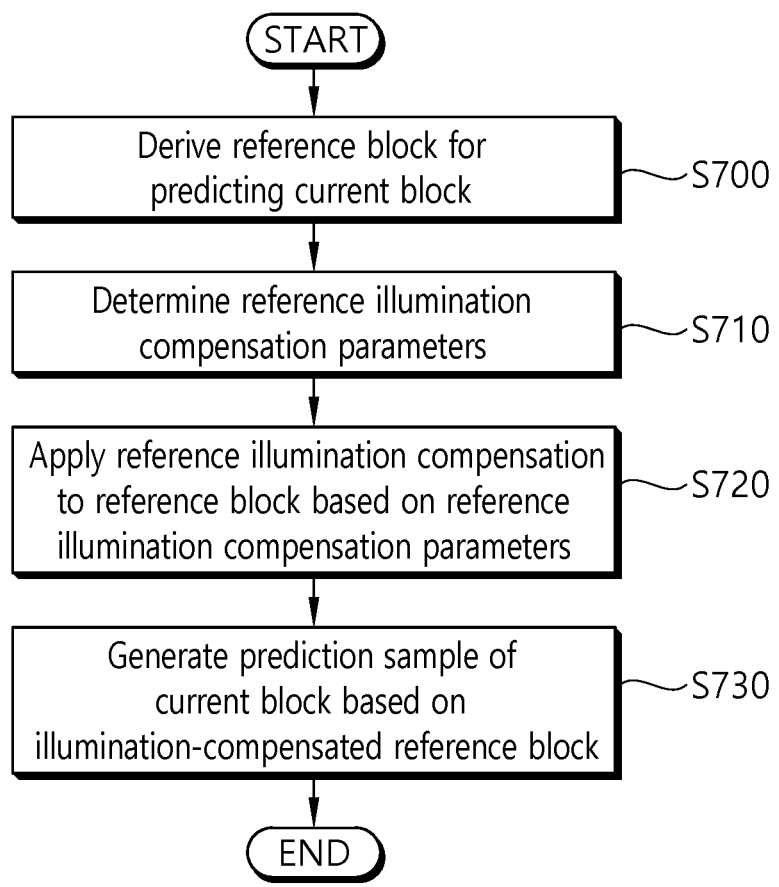

METHOD AND DEVICE FOR PREDICTING BLOCK ON BASIS OF ILLUMINATION COMPENSATION IN IMAGE CODING SYSTEM

CROSS-REFERENCE TO RELATED APPLICATIONS

This application is a National Stage application under 35 U.S.C. § 371 of International Application No. PCT/KR2015/013447, filed Dec. 9, 2015, which claims the benefit of U.S. Provisional Application No. 62/180,072, filed on Jun. 16, 2015. The disclosures of the prior applications are incorporated by reference in their entirety.

BACKGROUND OF THE INVENTION

Field of the Invention

The present invention relates to a video compression technology, and more particularly, to a method and device for predicting a block on the basis of illumination compensation in an image coding system.

Related Art

The need for images of high resolution and high quality has recently been increasing in various fields. As the resolution and quality of an image is improved, the amount of data in the image is also likewise increased.

Due to the increase in the amount of information, devices with various performance and networks of various environments are emerging. With the emergence of devices with diverse capabilities and networks of diverse environments, it has become possible to use the same content at varying levels of quality.

Specifically, due to the fact that the image quality that the terminal device can support is diversified, and the network environment that is constructed becomes various, in some environments, images of general quality are used, while, in other environments, images of higher quality are available.

For example, a consumer who purchases video content from a mobile terminal may view the same video content on a larger screen and with a higher resolution using a large screen for home use.

In recent years, as broadcasts with HD (High Definition) resolution are being served, many users are already becoming accustomed to high resolution, high quality images, etc. In addition to HDTV, service providers and users are paying attention to UHD (Ultra High Definition) or better services that have more than four times the resolution of HDTVs.

Accordingly, the amount of data for a single video is increasing more and more, and there is a need for a video compression technology using efficient block prediction.

SUMMARY OF THE INVENTION

A technical aspect of the present invention is to provide a method and a device for enhancing image coding efficiency.

Another technical aspect of the present invention is to provide a method and device for predicting a block on the basis of reference illumination compensation.

Yet another technical aspect of the present invention is to enhance block prediction efficiency through reference illumination compensation.

A further technical aspect of the present invention is to reduce residual signals and enhance compression efficiency by enhancing prediction efficiency.

A further technical aspect of the present invention is to adaptively apply reference illumination compensation for higher prediction efficiency.

An exemplary embodiment of the present invention provides a prediction method for decoding a picture. The method includes: deriving a reference block from a reference picture to predict a current block in a current picture; determining reference illumination compensation (IC) parameters; generating an illumination-compensated reference block by applying reference IC to the reference block on the basis of the reference IC parameters; and generating a prediction sample of the current block on the basis of the illumination-compensated reference block.

Another exemplary embodiment of the present invention provides a picture decoding apparatus. The apparatus includes: a receiver that receives a reference IC flag; and a processor that derives a reference block from a reference picture to predict a current block in a current picture, determines reference illumination compensation (IC) parameters if the reference IC flag indicates 1, generates an illumination-compensated reference block by applying reference IC to the reference block on the basis of the reference IC parameters, and generates a prediction sample of the current block on the basis of the illumination-compensated reference block.

According to the present invention, an illumination difference between the current block of the current picture and the reference block of the reference picture can be compensated for, block prediction efficiency can be increased, and the amount of data in a residual signal to be transmitted from an encoder to a decoder can be reduced. Therefore, compression and coding efficiency can be increased.

BRIEF DESCRIPTION OF THE DRAWINGS

FIG. 5 illustrates an example of neighboring samples used to calculate reference IC parameters.

FIG. 6 is a flowchart schematically illustrating a picture encoding method which is performed by an encoder.

FIG. 7 is a flowchart schematically illustrating a block prediction method for picture decoding which is performed by a decoder.

DESCRIPTION OF EXEMPLARY EMBODIMENTS

Figure 1:
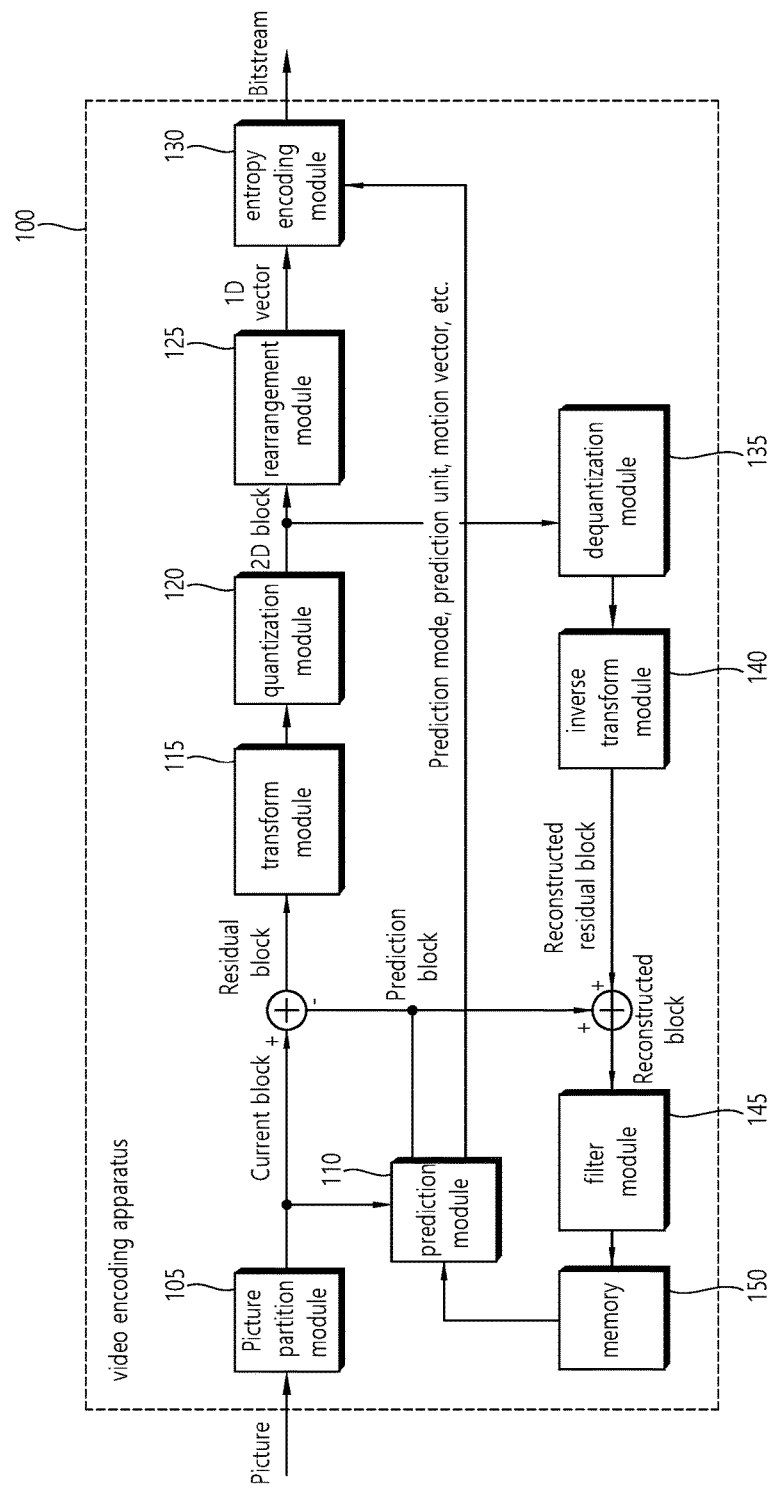
FIG. 1 is a block diagram schematically illustrating a video encoder according to an embodiment of the invention.

The present invention can be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding device and does not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, exemplary embodiments of the invention will be described in detail with reference to the accompanying drawings.

FIG. 1 is a block diagram schematically illustrating a video encoder according to an embodiment of the invention.

Referring to FIG. 1, a video encoder 100 includes a picture partitioning module 105, a prediction module 110, a transform module 115, a quantization module 120, a rearrangement module 125, an entropy encoding module 130, a dequantization module 135, an inverse transform module 140, a filtering module 145, and a memory 150.

The picture partitioning module 105 may be configured to split the input picture into at least one processing unit block. In this connection, a block as a processing unit may be a prediction unit PU, a transform unit TU, or a coding unit CU. The picture may be composed of a plurality of coding tree unit CTUs. Each CTU may be split into CUs as a quad tree structure. The CU may be split into CUs having a deeper depth as a quad-tree structures. The PU and TU may be obtained from the CU. For example, the PU may be partitioned from a CU into a symmetric or asymmetric square structure. Further, the TU may be split into a quad tree structure from the CU.

The prediction module 110 includes an inter prediction module that performs an inter prediction process and an intra prediction module that performs an intra prediction process, as will be described later. The prediction module 110 performs a prediction process on the processing units of a picture divided by the picture dividing module 105 to create a prediction block including a prediction sample or a prediction sample array. In the prediction module 110, the processing unit of a picture may be a CU, a TU, or a PU. The prediction module 110 may determine whether the prediction performed on the corresponding processing unit is an inter prediction or an intra prediction, and may determine specific details for example, a prediction mode of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

The inter prediction may use a skip mode, a merge mode, or Advanced Motion Vector Prediction (AMVP). In the inter prediction, a reference picture may be selected for the PU, and a reference block corresponding to the PU may be selected. The reference block may be an integer pixel or sample unit, or a fractional pixel or sample unit. The prediction block is then generated for which the residual signal relative to the current PU is minimized and the motion vector size is minimized.

A prediction block may be generated as an integer pixel unit, or as a fractional pixel unit such as a ½ pixel unit or a ¼ pixel unit. In this connection, a motion vector may also be expressed as a fractional pixel unit.

Information such as the index of the reference picture selected via the inter prediction, the motion vector difference MDV, the motion vector predictor MVP, residual signal, etc., may be entropy encoded and then transmitted to the decoder. When the skip mode is applied, the prediction block may be used as a reconstruction block, so that the residual may not be generated, transformed, quantized, or transmitted.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes, as an example. The non-directional modes may include a DC prediction mode and a planar mode.

In the intra prediction, a prediction block may be constructed after a filter is applied to a reference sample. At this time, it may be determined whether a filter should be applied to a reference sample depending on the intra prediction mode and/or the size of a current block.

Residual values (a residual block or a residual signal) between the constructed prediction block and the original block are input to the transform module 115. The prediction mode information, the motion vector information, and the like used for the prediction are encoded along with the residual values by the entropy encoding module 130 and are transmitted to the decoder.

The transform module 115 performs a transform process on the residual block in the unit of TUs and creates transform coefficients.

A transform block is a rectangular block of samples and is a block to which the same transform is applied. The transform block may be a TU and may have a quad-tree structure.

The transform module 115 may perform a transform process depending on the prediction mode applied to a residual block and the size of the block.

For example, when intra prediction is applied to a residual block and the residual block has an 4×4 array, the residual block is transformed using discrete sine transform DST. Otherwise, the residual block may be transformed using discrete cosine transform DCT.

The transform module 115 may construct a transform block of transform coefficients through the transform.

The quantization module 120 may quantize the residual values, that is, transform coefficients, transformed by the transform module 115 and may create quantization coefficients. The values calculated by the quantization module 120 may be supplied to the dequantization module 135 and the rearrangement module 125.

The rearrangement module 125 may rearrange the transform coefficients supplied from the quantization module 120. By rearranging the quantization coefficients, it is possible to enhance the encoding efficiency in the entropy encoding module 130.

The rearrangement module 125 may rearrange the quantized transform coefficients in the form of a two-dimensional block to the form of a one-dimensional vector through the use of a coefficient scanning method.

The entropy encoding module 130 may be configured to entropy code the symbol according to a probability distribution based on the quantized transform values rearranged by the rearrangement module 125 or the encoding parameter value calculated during the encoding process, etc. and then to output a bit stream. The entropy encoding method is a method of receiving a symbol having various values and expressing the symbol as a binary string that can be decoded while removing statistical redundancy thereof.

In this connection, the symbol means the to-be encoded/decoded syntax element, coding parameter, residual signal value and so on. The encoding parameter is required for encoding and decoding. The encoding parameter may contain information that can be inferred during encoding or decoding, as well as information encoded in an encoder and passed to a decoder like the syntax element. The encoding parameter is the information needed to encode or decode the image. The encoding parameter may include statistics or values such as for example, the intra/inter prediction mode, movement/motion vector, reference picture index, coding block pattern, residual signal presence or absence, transform coefficient, quantized transform coefficient, quantization parameter, block size, block partitioning information, etc. Further, the residual signal may mean a difference between an original signal and a prediction signal. Further, the difference between the original signal and the prediction signal may be transformed to define the residual signal, or the difference between the original signal and the prediction signal may be transformed and quantized to define the residual signal. The residual signal can be called the residual block in the block unit.

When the entropy encoding is applied, the symbols may be expressed so that a small number of bits are allocated to a symbol having a high probability of occurrence, and a large number of bits are allocated to a symbol having a low probability of occurrence. This may reduce the size of the bit string for the to-be-encoded symbols. Therefore, the compression performance of image encoding may be increased via the entropy encoding.

Encoding schemes such as exponential golomb, Context-Adaptive Variable Length Coding (CAVLC), and Context-Adaptive Binary Arithmetic Coding (CABAC) may be used for the entropy encoding. For example, the entropy encoding module 130 may store therein a table for performing entropy encoding, such as a variable length coding/code (VLC) table. The entropy encoding module 130 may perform entropy encoding using the stored VLC table. Further, the entropy encoding module 130 derives a binarization method of a corresponding symbol and a probability model of a corresponding symbol/bin, and then performs entropy encoding using the derived binarization method or probability model.

The entropy encoding module 130 may give a predetermined change to a parameter set or syntaxes to be transmitted, if necessary.

The dequantization module 135 dequantizes the values transform coefficients quantized by the quantization module 120. The inverse transform module 140 inversely transforms the values dequantized by the dequantization module 135.

The residual value or residual sample or residual sample array generated by the dequantization module 135 and the inverse-transform module 140, and the prediction block predicted by the prediction module 110 may be combined to form a reconstructed block including a reconstructed sample or a reconstructed sample array.

In FIG. 1, a residual block and a prediction block are added to create a reconstructed block by an adder. At this time, the adder may be considered as a particular module reconstructed block creating module that creates a reconstructed block.

The filtering module 145 applies a deblocking filter, an ALF Adaptive Loop Filter, an SAO Sample Adaptive Offset to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filtering module 145 may not perform a filtering operation on the reconstructed block used in the inter prediction.

The memory 150 may store the reconstructed block or picture calculated by the filtering module 145. The reconstructed block or picture stored in the memory 150 may be supplied to the prediction module 110 that performs the inter prediction.

Figure 2:
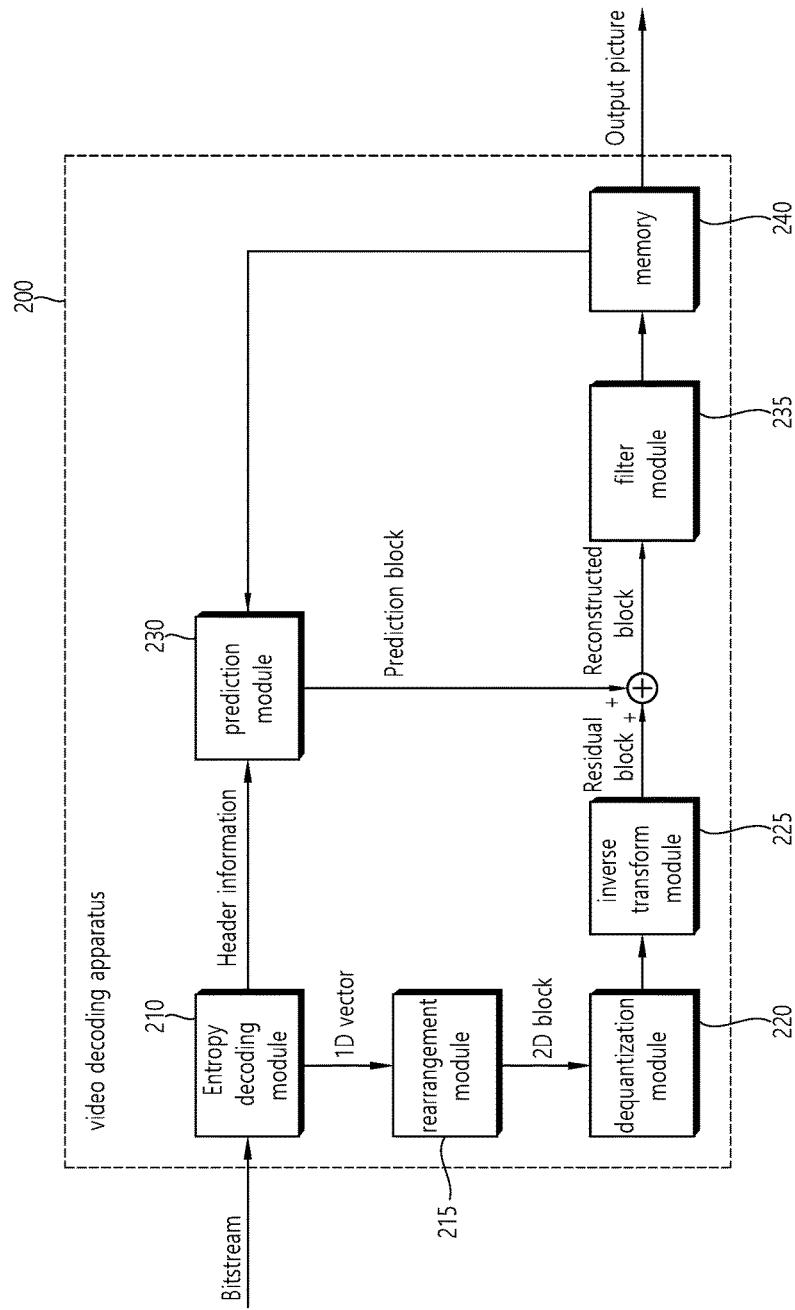
FIG. 2 is a block diagram schematically illustrating a video decoder according to an embodiment of the invention.

FIG. 2 is a block diagram schematically illustrating a video decoder according to an embodiment of the invention. Referring to FIG. 2, a video decoder 200 may include an entropy decoding module 210, a rearrangement module 215, a dequantization module 220, an inverse transform module 225, a prediction module 230, a filtering module 235, and a memory 240.

When a video bitstream is input from the video encoder, the input bitstream may be decoded on the basis of the order in which video information is processed by the video encoder.

The entropy decoding module 210 may entropy-decode the input bitstream according to a probability distribution to generate symbols in a quantized coefficient form. The entropy decoding method is a method of receiving a sequence of binary numbers and generating each of the symbols using the sequence. The entropy decoding method is similar to the entropy encoding method described above.

For example, when a Variable Length Coding VLC (hereinafter referred to as 'VLC') such as CAVLC is used to perform entropy encoding in a video encoder, the entropy decoding module 210 may perform decoding using the same VLC table as the encoder used in the encoder. Further, when CABAC is used to perform entropy encoding in a video encoder, the entropy decoding module 210 may perform the entropy decoding using CABAC.

More specifically, the CABAC entropy decoding method may include receiving a bin corresponding to each syntax element in a bitstream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information for constructing a predicted block out of the information decoded by the entropy decoding module 210 may be supplied to the prediction module 230, and the residual values, that is, the quantized transform coefficients, entropy-decoded by the entropy decoding module 210 may be input to the rearrangement module 215.

The rearrangement module 215 may rearrange the bitstream information, that is, the quantized transform coefficients, entropy-decoded by the entropy decoding module 210 on the basis of the rearrangement method in the video encoder.

The rearrangement module 215 may reconstruct and rearrange the coefficients expressed in the form of a one-dimensional vector into coefficients in the form of a two-dimensional block. The rearrangement module 215 may scan the coefficients on the basis of the prediction mode applied to the current block transform block and the size of the transform block and may create an array of coefficients quantized transform coefficients in the form of a two-dimensional block.

The dequantization module 220 may perform dequantization on the basis of the quantization parameters supplied from the video encoder and the coefficient values of the rearranged block.

The inverse transform module 225 may perform the inverse DCT and/or inverse DST of the DCT and/or DST, which has been performed by the transform module of the video encoder, on the quantization result from the video encoder.

The inverse transform may be performed on the basis of a transfer unit or a partition unit of a picture determined by the video encoder. The transform module of the video encoder may selectively perform the DCT and/or DST depending on plural information pieces such as the prediction method, the size of a current block, and the prediction direction, and the inverse transform module 225 of the video decoder may perform the inverse transform on the basis of the transform information on the transform performed by the transform module of the video encoder.

The prediction module 230 generates a prediction block including a prediction sample or a prediction sample array based on the prediction block generation-related information provided by the entropy decoding module 210 and the previously decoded block and/or picture information provided from the memory 240.

If the prediction mode for the current PU is the intra prediction mode, the prediction module 230 may perform the intra prediction to generate a prediction block based on pixel information in the current picture.

If the prediction mode for the current PU is the inter prediction mode, the prediction module 230 may be configured to perform inter prediction on a current PU based on information included in at least one picture of a previous picture or a subsequent picture to the current picture. In this connection, information about the motion information necessary for inter prediction of the current PU provided in the video encoder, such as motion vector and reference picture index may be deduced via checking the skip flag and merge flag received from the encoder.

The prediction module 230 may generate a prediction block such that the residual signal relative to the current block is minimized and the motion vector size is minimized when inter prediction is performed on the current picture.

On the other hand, the motion information derivation method may be changed according to the prediction mode of the current block. The prediction mode applied to inter prediction may include an Advanced Motion Vector Prediction (AMVP) mode, a merge mode, and the like.

In an example, when the merge mode is applied, the encoder and decoder generate a merge candidate list using the motion vector of a reconstructed spatial neighboring block and/or a motion vector corresponding to a Col block as a temporal neighboring block. In the merge mode, the motion vector of a candidate block selected from the merge candidate list is used as the motion vector of the current block. The encoder may transmit to the decoder a merge index indicating the candidate block with the optimal motion vector selected from among the candidate blocks included in the merge candidate list. In this connection, the decoder may derive the motion vector for the current block using the merge index.

In another example, when the AMVP (Advanced Motion Vector Prediction) mode is applied, the encoder and decoder generate a motion vector predictor candidate list using a motion vector of a reconstructed spatial neighboring block and/or a motion vector corresponding to a Col block as a temporal neighboring block. That is, the motion vector of the reconstructed spatial neighboring block and/or the motion vector corresponding to the Col block as a temporal neighboring block may be used as a motion vector candidate. The encoder may transmit to the decoder a prediction motion vector index indicating the optimal motion vector selected from among the motion vector candidates included in the motion vector predictor candidate list. In this connection, the decoder may select the prediction motion vector for the current block from the motion vector candidates included in the motion vector candidate list using the motion vector index.

The encoder may obtain the motion vector difference MVD between the motion vector for the current block and the motion vector predictor (MVP), encode the MVD, and transmit the encoded MVD to the decoder. That is, the MVD may be a value obtained by subtracting the motion vector predictor (MVP) from the motion vector (MV) for the current block. In this connection, the decoder may decode the received motion vector difference, and derive the motion vector for the current block via addition between the decoded motion vector difference and the motion vector predictor.

Further, the encoder may transmit a reference picture index indicating a reference picture to the decoder.

The decoder may predict the motion vector of the current block using the motion information of the neighboring block and derive the motion vector of the current block using the residual received from the encoder. The decoder may generate the prediction block for the current block based on the derived motion vector and the reference picture index information received from the encoder.

In another example, when the merge mode is applied, the encoder and decoder may generate a merge candidate list using the motion information of the reconstructed neighboring block and/or the motion information of the Col block. That is, when the reconstructed neighboring block and/or the motion information of the Col block exists, the encoder and decoder may use the reconstructed neighboring block and/or the motion information of the Col block as a merge candidate for the current block.

The encoder may select a merge candidate that provides optimal encoding efficiency among the merge candidates included in the merge candidate list as the motion information for the current block. In this connection, a merge index indicating the selected merge candidate may be included in the bitstream which is transmitted to the decoder. The decoder may select one of the merge candidates included in the merge candidate list using the transmitted merge index, and the decoder may determine the selected merge candidate as motion information of the current block. Therefore, when the merge mode is applied, the motion information of the reconstructed neighboring block and/or the Col block may be used as the motion information for the current block as it is. The decoder may reconstruct the current block by adding the prediction block and the residual transmitted from the encoder to each other.

In the above-described AMVP and merge modes, motion information of the reconstructed neighboring block and/or motion information of the Col block may be used to derive motion information of the current block.

In the skip mode, which is one of the other modes used for inter-picture prediction, neighboring block information may be used for the current block as it is. Therefore, in the case of skip mode, the encoder does not transmit syntax information such as the residual to the decoder in addition to information indicating which block's motion information to use as the motion information for the current block.

The encoder and the decoder may generate a prediction block of the current block by performing motion compensation on the current block based on the derived motion information. In this connection, a prediction block may refer to a motion-compensated block as generated by performing motion compensation on the current block. Further, a plurality of motion compensated blocks may constitute a single motion compensated image.

The reconstructed block may be generated using the prediction block generated by the prediction module 230 and the residual block provided by the inverse-transform module 225. FIG. 2 illustrates that using the adder, the prediction block and the residual block are combined to generate the reconstructed block. In this connection, the adder may be viewed as a separate module (a reconstructed block generation module) that is configured to generate the reconstructed block. In this connection, the reconstructed block includes a reconstructed sample or a reconstructed sample array as described above; the prediction block includes a prediction sample or a prediction sample array; the residual block may include a residual sample or a residual sample array. Therefore, the reconstructed sample or the reconstructed sample array can be considered to be generated by combining the corresponding prediction sample or prediction sample array with the corresponding residual sample or residual sample array.

When the skip mode is used for a block, the residual signal may not be transmitted and the predicted block may be used as a reconstructed block.

The reconstructed block and/or picture may be supplied to the filtering module 235. The filtering module 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output module.

The elements that is directly related to decoding images among the entropy decoding module 210, the rearrangement module 215, the dequantization module 220, the inverse transform module 225, the prediction module 230, the filtering module 235 and the memory 240 which are included in the decoding apparatus 200, for example, the entropy decoding module 210, the rearrangement module 215, the dequantization module 220, the inverse transform module 225, the prediction module 230, the filtering module 235, and so on may be expressed as a decoder or a decoding unit that is distinguished from other elements.

In addition, the decoding apparatus 200 may further include a parsing unit not shown in the drawing that parses information related to the encoded images included in a bitstream. The parsing unit may include the entropy decoding module 210, and may be included in the entropy decoding module 210. Such a parsing unit may also be implemented as an element of the decoding unit.

In the above-described encoding/decoding process, the accuracy of prediction is closely related to the size and characteristics of a residual signal. The higher the accuracy of prediction, the smaller the amount of data in the residual signal, which may result in higher compression efficiency.

Meanwhile, if there is a light source or shadow in a picture, a local illumination change occurs to the affected region. In this case, when performing a prediction on an object, the performance of prediction is decreased because of the difference in illumination between a current block of a current picture and a reference block of a reference picture. This is because a general motion estimation/compensation algorithm used in a video encoding/decoding process cannot compensate for such a local illumination change. On the other hand, as long as such a local illumination change is compensated for, a more accurate prediction can be made.

Figure 3:
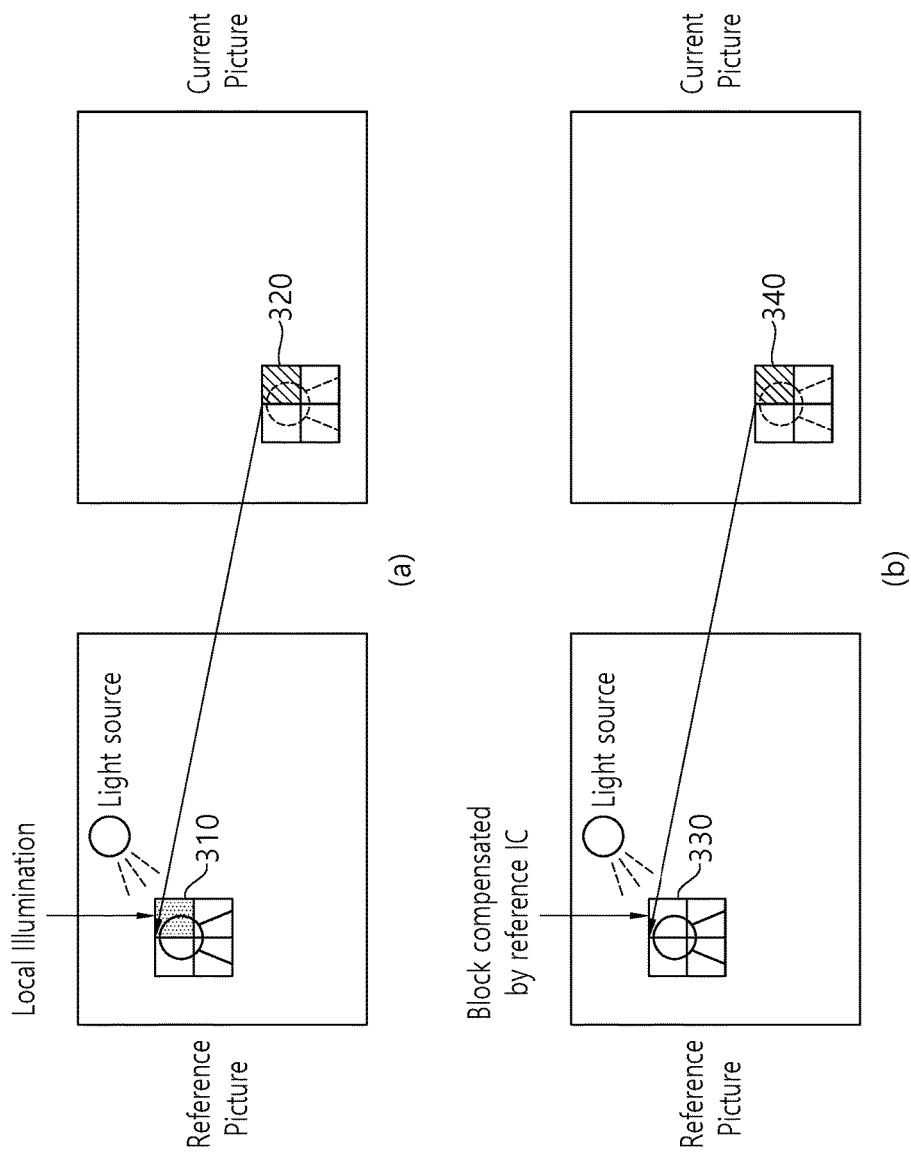
FIG. 3 illustrates an example of how prediction varies depending on whether illumination compensation IC is applied or not.

FIG. 3 illustrates an example of how prediction varies depending on whether illumination compensation IC is applied or not.

In (a) of FIG. 3, a corresponding block 310 of a reference picture may have a locally higher illumination level due to a light source, compared to a current block 320 of a current picture 320 to which an (inter) prediction is to be made. This may be due to a temporal difference between the current picture and the reference picture, a difference between the positions of objects in the current picture and the positions of objects in the reference picture, and/or the difference in position between the reference block and the current block. In this case, the encoder may decide to use the block 310 as a reference block or other blocks neighboring it as a reference block. However, there are problems such as lower prediction efficiency and the need to allocate much data to a residual signal.

Meanwhile, as in (b), prediction efficiency can be increased by predicting a current block 340 based on a reference block 330 that is compensated by illumination compensation IC according to the present invention. In this case, the residual between the predicted current block and the original block is reduced, and therefore less data is allocated to a residual signal and coding efficiency is improved. Such a method of increasing prediction efficiency by applying illumination compensation to a reference block may be called reference illumination compensation (reference IC).

For reference IC according to the present invention, a mathematical expression like the following Equation 1, for example, may be used:

$$\Sigma y \approx a * \Sigma x + b \quad \text{[Equation 1]}$$

where a and b are parameters for illumination compensation, x is a signal of a reference picture, and y is a signal of a current picture or original picture. Here, the term signal may refer to a sample value (or pixel value; hereinafter, the term sample may include a pixel) in a related picture. That is, x may be a sample value in a reference picture, and y may be a sample value in a current picture or a sample value in an original picture. The difference between the two sides of Equation 1 may be deemed an error, and parameters a and b satisfying a condition for minimizing the error may be obtained and applied to a reference block. Here, the parameters a and b may be called reference IC parameters.

Meanwhile, since the reference IC parameters a and b to be obtained by Equation 1 are values for minimizing errors on the two sides, an equation for obtaining the reference IC parameters may be expressed as follows:

$$E(a,b)=\Sigma_i(y_i-ax_i-b)^2+\lambda(a-1)^2 \qquad \text{[Equation 2]}$$

That is, E(a,b) denotes a and b values for minimizing errors, where i is the index of each sample, and λ (lambda) is a control parameter. λ may be preset or may be derived from x, for example. In an example, λ may be derived as in $\lambda=(\Sigma_i x_i x_i >> 7)$.

Here, Equation 2 can be written as follows:

$$\begin{pmatrix} \sum_i x_i x_i + \lambda & \sum_i x_i \\ \sum_i x_i & \sum_i 1 \end{pmatrix} \begin{pmatrix} a \\ b \end{pmatrix} = \begin{pmatrix} \sum_i x_i y_i + \lambda \\ \sum_i y_i \end{pmatrix} \qquad \text{[Equation 3]}$$

Based on Equation 3, the reference IC parameters a and b may be calculated as follows:

$$a = \frac{N\sum_i x_i y_i - \sum_i x_i \sum_i y_i + \lambda}{N\sum_i x_i x_i - \sum_i x_i \sum_i x_i + \lambda} \qquad \text{[Equation 4]}$$

$$b = \sum_i y_i - a * \sum_i x_i \qquad \text{[Equation 5]}$$

where N is a normalization parameter. Here, N may be derived from $$\sum_i 1$$

of Equation 3. For example, N may have a value equal to the size of the block to be compensated.

The reference IC parameters may be obtained in various ways depending on which samples are used as x and y.

i) In an example, the reference IC parameters may be obtained based on a sample of a block in an original picture corresponding to a current block and a sample of a reference block in a reference picture. Alternatively, ii) in another example, the reference IC parameters may be obtained based on a neighboring sample of a current block in a current picture and a neighboring sample of a reference block in a reference picture. iii) In yet another example, the reference IC parameters may be obtained by selectively combining the methods of i) and ii).

As in i), in a case where the reference IC parameters are obtained based on an (original) sample of a block in an original picture corresponding to a current block and a (reference) sample of a reference block in a reference picture, y is the original sample of the original picture, and x is the reference sample of the reference picture, according to Equation 1. In this case, a reference IC-interpolated reference block may be generated based on the obtained reference IC parameters (a and b) and the reference sample in the reference block. Since an inter prediction is performed based on the IC-interpolated reference block, the efficiency of the inter prediction is improved, and residual signals are reduced. However, the reference IC parameters are obtained on the encoder side and encoded and transmitted to the decoder side since no original picture is present on the decoder side.

On the other hand, as in ii), in a case where the reference IC parameters are obtained based on a neighboring sample of a current block in a current picture and a neighboring sample of a reference block in a reference picture, y is the neighboring sample of the current block, and x is the neighboring sample of the reference block, according to Equation 1. In this case, a reference IC-interpolated reference block may be generated based on the obtained reference IC parameters (a and b) and the reference sample in the reference block. Since the reference IC parameters obtained using the relationship between neighboring samples are used, the reference IC interpolation efficiency (or accuracy) may be lower as compared to i). Nevertheless, there is an advantage in terms of coding efficiency because the decoder itself can obtain the corresponding parameters without explicitly receiving the reference IC parameters (i.e., a and b) from the encoder.

Figure 4:
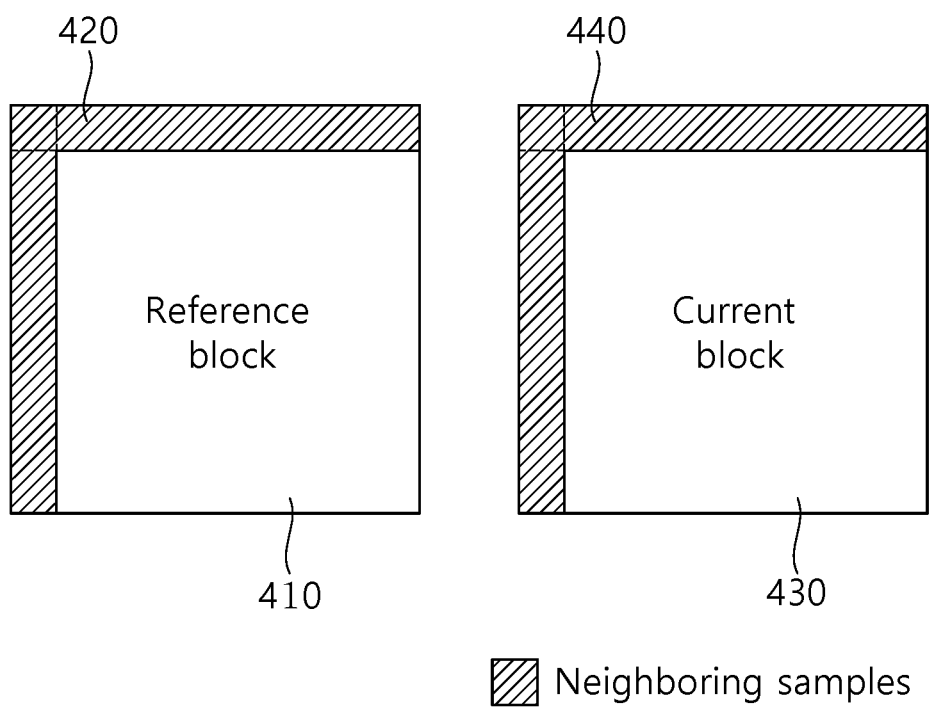
FIG. 4 is a view illustrating an example of neighboring samples that can be used to obtain reference IC parameters.

FIG. 4 is a view illustrating an example of neighboring samples that can be used to obtain reference IC parameters.

Referring to FIG. 4, neighboring samples 420 of a reference block 410 and neighboring samples 440 of a current block 430 may be used to obtain the IC reference parameters. The neighboring samples 420 of the reference block 410 may include left neighboring samples, upper neighboring samples, and left upper neighboring sample of the reference block 410, and all of the neighboring samples 420 may be used or some of them defined according to a criterion may be used. It can be assumed that the width and height of the reference block 410 are nRW and nRH, respectively, and the position of the far left top sample of the reference block 410 is (0,0). In this case, the position of the left upper neighboring sample may include (−1,−1), the positions of the left neighboring samples may include (−1,0), . . . , (−1,nRH−1), and the positions of the upper neighboring samples may include (0,−1), . . . , (nRW−1,−1).

The neighboring samples 440 of the current block 430 may include left neighboring samples, upper neighboring samples, and left upper neighboring sample of the current block 430, and all of the neighboring samples 440 may be used or some of them defined according to a criterion may be used. It can be assumed that the width and height of the current block 430 are nCW and nCH, respectively, and the position of the far left top sample of the current block 430 is (0,0). In this case, the position of the left upper neighboring sample may include (−1,−1), the positions of the left neighboring samples may include (−1,0), . . . , (−1,nCH−1), and the positions of the upper neighboring samples may include (0,−1), . . . , (nCW−1,−1).

In Equation 2, $x_i$ denotes the sample of index i among the neighboring samples 420 of the reference block 410, and $y_i$ denotes the sample of index i among the neighboring samples 440 of the current block 430.

In this case, the reference IC parameters a and b can be calculated as in Equations 4 and 5.

In this case, to calculate the reference IC parameters a and b, all or some of the neighboring samples 420 and 440 may be used according to a set criterion.

That is, when using neighboring samples of a reference block/current block to calculate the reference IC parameters, i) all of these neighboring samples of the reference block/current block may be used, or ii) some of these neighboring samples of the reference block/current block may be used, or iii) the methods of i) and ii) may be selectively combined. The neighboring samples to be used may be determined in advance in consideration of the complexity and efficiency of the calculation, or may be adaptively determined by the encoder in consideration of RD (rate-distortion) costs. For example, if the size and/or quantization parameter of the current block are below a certain value, all of the above-mentioned neighboring samples may be used, or some of the above-mentioned neighboring samples may be used according to a set condition.

FIG. 5 illustrates an example of neighboring samples used to calculate reference IC parameters. A block to be predicted in FIG. 5 may be a reference block or a current block.

Referring to FIG. 5, as in (a), all of left neighboring samples and upper neighboring samples of the block to be predicted may be used to calculate reference IC parameters. In this case, the left upper neighboring sample may be used or not used. In this case, the neighboring samples of the reference block and the neighboring samples of the current block may be used as input into the above-described Equations 1 to 5.

Moreover, as in (b), some of the left neighboring samples of the block to be predicted, from the top down to a specific reference point (e.g., an nth sample), and some of the upper neighboring samples, from the leftmost side to a specific reference point (e.g., an mth sample), may be used to calculate the reference IC parameters. In this case, the left upper neighboring sample may be used or not used.

In addition, as in (c), sub-samples of the left neighboring samples and upper neighboring samples of the block to be predicted may be used to calculate the reference IC parameters. Here, the sub-sampling factor may be preset, or the encoder may set the sub-sampling factor and inform the decoder of it. For example, odd- or even-numbered samples among the left neighboring samples of the block to be predicted and odd- or even-numbered samples among the upper neighboring samples may be used to calculate the reference IC parameters. In this case, the left upper neighboring sample may be used or not used.

Furthermore, as in (d), particular samples may be selected according to a set criterion from among the left neighboring samples and upper neighboring samples of the block to be predicted and used to calculate the reference IC parameters. Here, a threshold value may be used to select particular samples. In this case, the left upper neighboring sample may be used or not used.

Meanwhile, only one sample line may be derived outward from the block to be predicted (reference block/current block) and used, or a plurality of sample lines may be derived and used. For example, with respect to the reference block 410 in FIG. 4, the upper neighboring samples among the neighboring samples 420 may be in one row or multiple rows, and the left neighboring samples may be in one column or in multiple columns. In this case, the left upper neighboring sample may be in one row/column or in multiple rows/columns. The left upper neighboring sample in multiple rows/columns represents left upper neighboring samples. Likewise, with respect to the current block 430, the upper neighboring samples among the neighboring samples 420 may be in one row or multiple rows, and the left neighboring samples may be in one column or in multiple columns. In this case, the left upper neighboring sample may be in one row/column or in multiple rows/columns. The left upper neighboring sample in multiple rows/columns represents left upper neighboring samples.

Meanwhile, the reference IC parameters a and b may be calculated to perform reference IC, or at least one of the two may not be calculated. i) In an example, a and b may be calculated and used. ii) In another example, either a or b may be calculated and used, and the other one may not be used. iii) In yet another example, either a or b may be calculated and used, and the other one may be substituted with a fixed value. iv) In a further example, in a specific situation, both a and b may be substituted with fixed values. v) The method of i) to iv) may be selectively combined and used. For example, in a case where neighboring samples are unavailable, a may be fixed to a specific value, and b may not be used. For the luma component, a may be fixed to 1, and only b may be calculated.

Meanwhile, whether to enable the above-described reference IC according to the present invention may be determined and signaled according to various criteria. For example, whether to enable reference IC may be determined based on basic units such as an entire sequence, one or more pictures, slices, CTBs, CUs, PUs, TUs, etc. Whether to enable reference IC may be determined for one or more types of the basic units listed above.

Within the same basic unit, whether to apply reference IC or not may be determined according to additional criteria. The additional criteria may be defined based on the characteristics of the basic unit, which include, for example, various characteristics such as block size (in the case of CTB/CU/PU/TU), prediction type, partition type, transform type, etc.

For example, when deciding whether to apply reference IC or not based on block size, whether to apply reference IC or not may be determined by the following methods. i) In an example, whether to apply reference IC or not may be determined based on block size according to a predetermined criterion. ii) In another example, information for determining whether to apply reference IC or not for each block size is transmitted from the encoder to the decoder. iii) In yet another example, information on the maximum block size and/or minimum block size to which reference IC is applied is transmitted from the encoder to the decoder. iv) the methods of i) to iii) may be selectively combined.

In the case the above related information is transmitted from the encoder to the decoder, this information may be adaptively transmitted for one or more slices or pictures.

Specifically, reference IC may be permitted only for CUs of a specific size (e.g., 64×64) or smaller. In this case, a reference IC flag is signaled per CU (i.e., from the encoder to the decoder) and the decoder may determine whether reference IC is applied or not, based on the reference IC flag. In this case, if the partition type of a corresponding CU is not 2N×2N or the corresponding CU is encoded by intra prediction (i.e., the prediction mode for the corresponding CU is intra prediction mode), reference IC is not permitted, and the reference IC flag may be set to 0 and signaled, or may not be transmitted. If the reference IC flag does not exist, the decoder may see the value as zero.

Meanwhile, the encoder may inform the decoder of the maximum CU size to which reference IC is applied per slice or picture. The maximum CU size may represent the value itself or a predefined index mapped to the corresponding value. Within the corresponding slice or picture, reference IC is permitted only for CUs smaller than or equal to the maximum CU size, in which case a reference IC flag indicating whether reference IC is applied or not is signaled.

In addition, an enable flag indicating whether reference IC is enabled or not may be signaled per slice or picture. That is, the encoder determines whether to enable reference IC or not per slice or picture, and transmits a (reference IC) enable flag indicating this. According to the enable flag value (e.g., value 0), the decoder does not apply reference IC to the slice or picture for which reference IC is disabled, and signals no related information. Meanwhile, if the enable flag indicates that reference IC is enabled (e.g., value 1), the encoder may transmit a reference IC flag per CU or PU within the corresponding slice or picture, and the decoder may apply reference IC to the corresponding CU or PU if the value of the reference IC flag is 1.

FIG. 6 is a flowchart schematically illustrating a picture encoding method which is performed by an encoder.

Referring to FIG. 6, the encoder derives a reference block for predicting a current block (S600). The encoder performs a current block prediction in the same way as the decoder in order to generate a residual signal, and, to this end, derives a reference block. Here, the prediction includes inter prediction. In inter prediction, the encoder may perform motion estimation and derive a reference block most similar to the current block from a reference picture, based on the motion estimation. In this case, the encoder may perform motion estimation per fractional sample, and may obtain the motion vector (MV) of the current block based on the relative position between the reference block and the current block.

The encoder determines reference IC parameters (S610). In an example, the encoder may calculate the reference IC parameters based on first neighboring samples of the reference block and second neighboring samples of the current block.

The reference IC parameters include parameters a and b, and at least one of the parameters a and b may be calculated based on the first neighboring samples of the reference block and the second neighboring samples of the current block. That is, both the parameters a and b may be calculated based on the first neighboring samples and the second neighboring samples. Otherwise, only one of the two may be calculated, or one of the two may not be used, or one of the two may have a fixed value, as described above. For example, the parameter a may be fixed to a specific value, and b may be calculated based on the first neighboring samples and the second neighboring samples.

Here, the first neighboring samples may include first left neighboring samples and first upper neighboring samples of the reference block, and the second neighboring samples may include second left neighboring samples and second upper neighboring samples of the current block. Here, the first left neighboring samples and the second left neighboring samples may consist of more than one column of samples, and the first upper neighboring samples and the second upper neighboring samples may consist of more than one row of samples. Sub-samples of the first left neighboring samples, first upper neighboring samples, second left neighboring samples, and second upper neighboring samples may be used to calculate at least one of the parameters a and b. For example, odd- or even-numbered samples among the first left neighboring samples, first upper neighboring samples, second left neighboring samples, and second upper neighboring samples may be used to calculate at least one of the parameters a and b. The first neighboring samples may include the first left upper neighboring sample of the reference block or not. Likewise, the second neighboring samples may include the second left upper neighboring sample of the current block or not.

In another example, the encoder may calculate the reference IC parameters based on samples in the reference block and samples in a block in an original picture corresponding to the current block. In this case, the decoder cannot calculate the reference IC parameters since it does not have the original picture, and, as will be described later, information indicating the corresponding reference IC parameters is transmitted from the encoder to the decoder.

The encoder applies reference IC to the reference block based on the reference IC parameters to generate an illumination-compensated reference block (S620). By applying illumination compensation to the reference block, a local illumination difference caused by a light source can be compensated for, and inter prediction efficiency can be enhanced.

The encoder generates a prediction sample for the current block based on the illumination-compensated reference block (S630). The encoder may generate a prediction sample for the current block more similar to the original picture by performing an inter prediction based on the illumination-compensated reference block.

The encoder generates and transmits a residual signal for the current block (S640). The encoder generates a residual signal based on a sample of a block in an original picture corresponding to the current block and the prediction sample of the current block derived based on the compensated reference block. In this case, the residual signal may be transmitted in a bitstream.

Meanwhile, the encoder may generate a reference IC flag indicating whether reference IC is applied or not for the current block and transmit it to the decoder. Moreover, the encoder may generate a reference IC enable flag indicating whether reference IC is enabled or not, and transmit it to the decoder. Here, the reference IC enable flag may be transmitted at a higher level than the reference IC flag. For example, the reference IC flag may be transmitted through a syntax for the CU or PU in which the current block is included, and the reference IC enable flag may be transmitted through a syntax for the slice, picture (i.e., current picture), or sequence in which the current block is included. For example, the current block may belong to a CU or a PU.

In addition, the encoder may generate information on the maximum or minimum CU size to which the reference IC is applicable, and transmit the corresponding information to the decoder. The information on the maximum or minimum CU size may be transmitted through a syntax for the slice, picture, or sequence in which the current block is included.

The encoder may generate and transmit the reference IC flag only when the value of the reference IC enable flag is 1 or only when the CU in which the current block is included meets the maximum or minimum CU size requirement.

Meanwhile, once the reference IC parameters are calculated based on samples in the reference block and samples in the corresponding block in the original picture as described above, information indicating the reference IC parameters may be included in the bitstream and transmitted to the decoder.

FIG. 7 is a flowchart schematically illustrating a block prediction method for picture decoding which is performed by a decoder.

Referring to FIG. 7, the decoder derives a reference block for predicting a current block (S700). Here, the prediction includes inter prediction. In inter prediction, the encoder may perform motion estimation and derive a reference block from a reference picture, based on the motion estimation. In this case, the decoder may derive the motion vector of the current block based on the motion vector, etc. of a spatial/temporal neighboring block, and derive the reference block existing at a position the motion vector of the current block indicates on the reference picture.

The decoder determines reference IC parameters (S710). In an example, the decoder may calculate the reference IC parameters based on first neighboring samples of the reference block and second neighboring samples of the current block.

The reference IC parameters include parameters a and b, and at least one of the parameters a and b may be calculated based on the first neighboring samples of the reference block and the second neighboring samples of the current block. That is, both the parameters a and b may be calculated based on the first neighboring samples and the second neighboring samples. Otherwise, only one of the two may be calculated, or one of the two may not be used, or one of the two may have a fixed value, as described above. For example, the parameter a may be fixed to a specific value, and b may be calculated based on the first neighboring samples and the second neighboring samples.

Here, the first neighboring samples may include first left neighboring samples and first upper neighboring samples of the reference block, and the second neighboring samples may include second left neighboring samples and second upper neighboring samples of the current block. Here, the first left neighboring samples and the second left neighboring samples may consist of more than one column of samples, and the first upper neighboring samples and the second upper neighboring samples may consist of more than one row of samples. Sub-samples of the first left neighboring samples, first upper neighboring samples, second left neighboring samples, and second upper neighboring samples may be used to calculate at least one of the parameters a and b. For example, odd- or even-numbered samples among the first left neighboring samples, first upper neighboring samples, second left neighboring samples, and second upper neighboring samples may be used to calculate at least one of the parameters a and b. The first neighboring samples may include the first left upper neighboring sample of the reference block or not. Likewise, the second neighboring samples may include the second left upper neighboring sample of the current block or not.

In another example, information on the reference IC parameters may be received from the encoder. In this case, the reference IC parameters may be calculated by the encoder based on samples in the reference block and samples in a block in an original picture corresponding to the current block.

The decoder applies reference IC to the reference block based on the reference IC parameters to generate an illumination-compensated reference block (S720). The decoder generates a prediction sample for the current block based on the illumination-compensated reference block (S730). The decoder may generate a prediction sample for the current block more similar to the original picture by performing an inter prediction based on the illumination-compensated reference block.

Meanwhile, the decoder may receive a residual signal for the current block. In this case, the residual signal may be received in a bitstream. The decoder may generate a reconstructed sample based on the residual signal and the prediction sample of the current block, and reconstruct the current picture.

Meanwhile, the decoder may receive a reference IC flag indicating whether reference IC is applied or not for the current block. Moreover, the decoder may receive a reference IC enable flag indicating whether reference IC is enabled or not. Here, the reference IC enable flag may be received at a higher level than the reference IC flag. For example, the reference IC flag may be received for the CU or PU in which the current block is included, and the reference IC enable flag may be received for the slice, picture (i.e., current picture), or sequence in which the current block is included. For example, the current block may belong to a CU or a PU.

In addition, the decoder may receive information on the maximum or minimum CU size to which the reference IC is applicable. The information on the maximum or minimum CU size may be received for the slice, picture, or sequence in which the current block is included.

The decoder may receive the reference IC flag only when the value of the reference IC enable flag is 1 or only when the CU in which the current block is included meets the maximum or minimum CU size requirement. Also, the decoder may determine or receive the reference IC parameters only when the value of the reference IC flag is 1.

Using this method, an illumination difference between the current block of the current picture and the reference block of the reference picture can be compensated for, block prediction efficiency can be increased, and therefore the amount of data in a residual signal can be reduced. Therefore, compression and coding efficiency can be increased.

The above description is only illustrative of the technical idea of the present invention. Therefore, those skilled in the art may make various modifications and variations to the above description without departing from the essential characteristics of the present invention. Accordingly, the embodiments disclosed herein are intended to be illustrative, not limiting, of the present invention. The scope of the present invention is not limited by these embodiments. The scope of protection of the present invention should be construed according to the following claims.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means.

What is claimed is:

1. A block prediction method, which is performed by a decoding apparatus, the method comprising:
   deriving a reference block from a reference picture to predict a current block in a current picture;
   determining reference illumination compensation (IC) parameters;
   generating an illumination-compensated reference block by applying reference IC to the reference block based on the reference IC parameters; and
   generating prediction samples of the current block based on the illumination-compensated reference block,
   wherein the reference IC parameters comprise parameters a and b, and at least one of the parameters a and b is calculated based on first neighboring samples of the reference block and second neighboring samples of the current block,
   wherein the first neighboring samples comprise first left neighboring samples and first upper neighboring samples of the reference block, and the second neighboring samples comprise second left neighboring samples and second upper neighboring samples of the current block, and wherein odd- or even-numbered samples among the first left neighboring samples, first upper neighboring samples, second left neighboring samples, and second upper neighboring samples are used to calculate at least one of the parameters a and b.

2. The method of claim 1, wherein the first left neighboring samples and the second left neighboring samples comprise more than one column of samples, and the first upper neighboring samples and the second upper neighboring samples comprise more than one row of samples.

3. The method of claim 1, wherein sub-samples of the first left neighboring samples, first upper neighboring samples, second left neighboring samples, and second upper neighboring samples are used to calculate at least one of the parameters a and b.

4. The method of claim 1, wherein the first neighboring samples comprise first left upper neighboring sample of the reference block, and the second neighboring samples comprise second left upper neighboring sample of the current block.

5. The method of claim 1, wherein both the parameters a and b are calculated based on the first neighboring samples and the second neighboring samples.

6. The method of claim 1, wherein the parameter a is fixed to a specific value, and the parameter b is calculated based on the first neighboring samples and the second neighboring samples.

7. The method of claim 1, further comprising receiving a reference IC flag indicating whether reference IC is applied or not for the current block, wherein the reference IC is applied to the reference block when a value of the reference IC flag is 1.

8. The method of claim 7, further comprising receiving a reference IC enable flag indicating whether reference IC is enabled or not, wherein the reference IC flag is received when the value of the reference IC enable flag is 1.

9. The method of claim 8, wherein the reference IC enable flag is received per slice or picture in which the current block is included.

10. The method of claim 7, further comprising receiving information of a maximum CU (Coding Unit) size to which the reference IC is applicable, wherein the reference IC flag is received when the CU size of the current block is smaller than or equal to the maximum CU size.

11. The method of claim 10, wherein the information of the maximum CU size is received per slice or picture in which the current block is included.

12. The method of claim 1, wherein odd-numbered samples among the first left neighboring samples, first upper neighboring samples, second left neighboring samples, and second upper neighboring samples are used to calculate at least one of the parameters a and b.

13. The method of claim 1, wherein even-numbered samples among the first left neighboring samples, first upper neighboring samples, second left neighboring samples, and second upper neighboring samples are used to calculate at least one of the parameters a and b.

14. The method of claim 1, wherein odd- or even-numbered samples among the first left neighboring samples, first upper neighboring samples, second left neighboring samples, and second upper neighboring samples are used to calculate the parameter a.

15. The method of claim 1, wherein odd- or even-numbered samples among the first left neighboring samples, first upper neighboring samples, second left neighboring samples, and second upper neighboring samples are used to calculate the parameter b.

16. The method of claim 1, wherein odd- or even-numbered samples among the first left neighboring samples, first upper neighboring samples, second left neighboring samples, and second upper neighboring samples are used to calculate the parameters a and b.

* * * * *